US007215126B2

(12) United States Patent
Furse et al.

(10) Patent No.: US 7,215,126 B2
(45) Date of Patent: May 8, 2007

(54) APPARATUS AND METHOD FOR TESTING A SIGNAL PATH FROM AN INJECTION POINT

(75) Inventors: Cynthia Furse, Salt Lake City, UT (US); Chet Lo, Salt Lake City, UT (US); You Chung Chung, Daegu (KR)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 11/241,757

(22) Filed: Sep. 30, 2005

(65) Prior Publication Data

US 2006/0087323 A1  Apr. 27, 2006

Related U.S. Application Data

(63) Continuation-in-part of application No. PCT/US04/10127, filed on Mar. 31, 2004, which is a continuation-in-part of application No. 11/133,145, filed on May 18, 2005, which is a continuation-in-part of application No. PCT/US03/37233, filed on Nov. 19, 2003.

(60) Provisional application No. 60/459,482, filed on Mar. 31, 2003, provisional application No. 60/427,737, filed on Nov. 19, 2002, provisional application No. 60/455,788, filed on Mar. 18, 2003, provisional application No. 60/477,391, filed on Jun. 9, 2003.

(51) Int. Cl.
*G01R 31/11* (2006.01)
*G06F 17/15* (2006.01)
*G06F 19/00* (2006.01)

(52) U.S. Cl. .................. 324/534; 702/108; 708/426

(58) Field of Classification Search ............... 324/534, 324/543, 539, 642, 76.33
See application file for complete search history.

(56) References Cited

U.S. PATENT DOCUMENTS

| 4,110,572 A | | 8/1978 | Cochrane |
| 4,307,267 A | * | 12/1981 | Peoples ............... 324/605 |
| 4,346,383 A | | 8/1982 | Woolcock et al. |
| 4,980,844 A | | 12/1990 | Demjaneko et al. |
| 5,068,614 A | | 11/1991 | Fields et al. |
| 5,229,726 A | | 7/1993 | Kent |

(Continued)

FOREIGN PATENT DOCUMENTS

FR  2718587 A1 * 10/1995

*Primary Examiner*—Anjan Deb
(74) *Attorney, Agent, or Firm*—Thorpe North & Western LLP

(57) ABSTRACT

The invention includes an apparatus and method for testing an electronic signal path. The apparatus includes a signal generator (102) configured to inject a test signal into the electronic signal path at an injection point when coupled to the signal path. The apparatus further includes a detector (104) coupled to the signal generator and configured to receive a combined signal at the injection point when coupled to the electronic signal path and determine an autocorrelation of the combined signal. The apparatus further includes an analyzer coupled to the detector and configured to determine a characteristic of the electronic signal path from the autocorrelation. The method includes injecting (902) a test signal into the electronic signal path an injection point, receiving (904) a combined signal from the electronic signal path at the injection point, determining (906) an autocorrelation of the combined signal, and estimating (908) a characteristic of the electronic signal path from the autocorrelation.

40 Claims, 13 Drawing Sheets

U.S. PATENT DOCUMENTS

| | | |
|---|---|---|
| 5,276,703 A | 1/1994 | Budin et al. |
| 5,600,660 A | 2/1997 | Wolf |
| 5,949,236 A | 9/1999 | Franchville |
| 6,002,361 A * | 12/1999 | Schipper ................ 342/357.03 |
| 6,137,293 A | 10/2000 | Wu et al. |
| 6,252,863 B1 * | 6/2001 | Raby et al. .................. 370/335 |
| 6,417,672 B1 * | 7/2002 | Chong ........................ 324/520 |
| 6,492,897 B1 * | 12/2002 | Mowery, Jr. ................. 455/522 |
| 6,636,048 B2 | 10/2003 | Sciacero et al. |
| 6,654,105 B2 | 11/2003 | Wang et al. |
| 6,967,584 B2 * | 11/2005 | Maki ........................... 340/657 |
| 7,069,163 B2 * | 6/2006 | Gunther et al. ............... 702/79 |
| 2002/0161542 A1 * | 10/2002 | Jones et al. ................. 702/108 |

* cited by examiner

APPARATUS AND METHOD FOR TESTING A SIGNAL PATH FROM AN INJECTION POINT

This application is a continuation-in-part of copending PCT Application No. PCT/US2004/010127 entitled "Apparatus and Method for Testing a Signal Path From an Injection Point" filed on Mar. 31, 2004 which claims the benefit of U.S. application Ser. No. 60/459,482 filed on Mar. 31, 2003 entitled "Mixed Signal Reflectometer Apparatus and Method for Determining the Integrity of Signal Paths."

This application is also continuation-in-part of copending U.S. application Ser. No. 11/133,145 filed on May 18, 2005 entitled "Device and Method for Detecting Anomolies in a Wire and Related Sensing Methods" which is a continuation-in-part of PCT Application No. PCT/US03/37233 filed on 19 Nov. 2003 entitled "Device and Method for Detecting Anomolies in a Wire and Related Sending Methods" which claims the benefit of U.S. application Ser. No. 60/427,737 filed on 19 Nov. 2002 entitled "Handheld Device for Detecting Open, Short and Location of Anomaly on a Wire," U.S. application Ser. No. 60/455,788 filed on 18 Mar. 2003 entitled "Noise Domain Reflectometer Apparatus and Method for Determining the Integrity and/or Lengths of Signal Paths," U.S. application Ser. No. 60/459,482 filed on 31 Mar. 2003 entitled "Mixed Signal Reflectometer Apparatus and Method for Determining the Integrity of Signal Paths," and U.S. application Ser. No. 60/477,391 filed on 9 Jun. 2003 entitled "Method and System for Robust Multi-Carrier Spread Spectrum Data Transmission over Partially Jammed Channels."

All of the above applications are hereby incorporated by reference for all that they disclose and for all purposes.

BACKGROUND OF THE INVENTION

1. Field of the Invention

The present invention relates generally to the field of electronic system testing. More particularly, the present invention relates to methods and apparatuses for testing the signal paths in electronic systems.

2. Related Art

Various techniques for testing signal paths in an electronic system are known, including the use of Time Delay Reflectometry (TDR), Frequency Domain Reflectometry (FDR), and Standing Wave Reflectometry (SWR). These conventional techniques are similar in that a test device injects a test signal and then observes the characteristics of a reflected signal reflected to the test device. The reflected signal characteristics are affected by discontinuities in the electrical properties of the signal path being tested. This allows characterization of the signal path, for example, the location of faults (such as open and short circuits), detecting mismatches, or measuring wire length.

These conventional techniques suffer from a number of disadvantages that make them cumbersome and expensive to implement. FDR requires two connections to the signal path being tested, most typically implemented by use of directional couplers, allowing the separation of the injected test signal from the reflected signal. These directional couplers are bulky and expensive. Directional couplers are also limited in frequency range, which limits the type of test signals that can be injected.

Although SWR can be used without directional couplers, SWR is typically limited to providing a pass/fail characterization of the signal path. In SWR techniques, the frequency spacing at which the reflected signal reaches minimums is determined to obtain a rough estimate of the location of a problem. SWR does not perform well when there are multiple problems in the signal path. Isolation of the actual location of the problem along the signal path is difficult to determine accurately with FDR or SWR.

TDR techniques avoid the problem of requiring two connections by injecting a time-limited pulse as the test signal. Confusion between the test signal and reflected signal is thus avoided because they are separated in time. Although TDR eliminates the complexity associated with the directional couplers, TDR suffers from requiring very precise timing. The accuracy with which TDR can locate a problem is limited by the accuracy by which the time-limited test pulse can be generated and the accuracy that the reflected signal can be measured. Hence, accurate TDR systems require complex and expensive timing circuitry. Furthermore, TDR cannot be used with signal paths that are designed to support a narrow range of frequencies because the TDR pulse is a wide-bandwidth signal.

SUMMARY OF THE INVENTION

It has been recognized that it would be advantageous to develop a flexible, portable testing device that can be connected to an electronic signal path at a single injection point and can accurately determine a characteristic of the electronic signal path.

In one embodiment, the invention includes an apparatus for testing a electronic signal path. The apparatus may include a signal generator configured to inject a test signal into the electronic signal path at an injection point. The apparatus may further include a detector coupled to the signal generator. The detector may be configured to receive a combined signal at the injection point and determine an autocorrelation of the combined signal. The combined signal may include the superposition of the test signal and reflections of the test signal from the electronic signal path. The apparatus may further include an analyzer coupled to the detector. The analyzer may be configured to determine a characteristic of the electronic signal path from the autocorrelation.

The apparatus can be used to characterize a electronic signal path, including determining the length of the electronic signal path, impedance of the electronic signal path, presence of faults in the electronic signal path, location of faults in the electronic signal path, and location of junctions in the electronic signal path. Various types of electronic signal paths may be characterized, including wires, twisted pairs, multi-conductor cables, coaxial cables, transmission lines, waveguides, and wireless paths.

The invention can provide reduced component cost relative to TDR technology, since high accuracy timing components and directional couplers are not required. The invention can also provide improved accuracy relative to SWR technology.

Additional features and advantages of the invention will be apparent from the detailed description which follows, taken in conjunction with the accompanying drawings, which together illustrate, by way of example, features of the invention.

DETAILED DESCRIPTION

Figure 1:
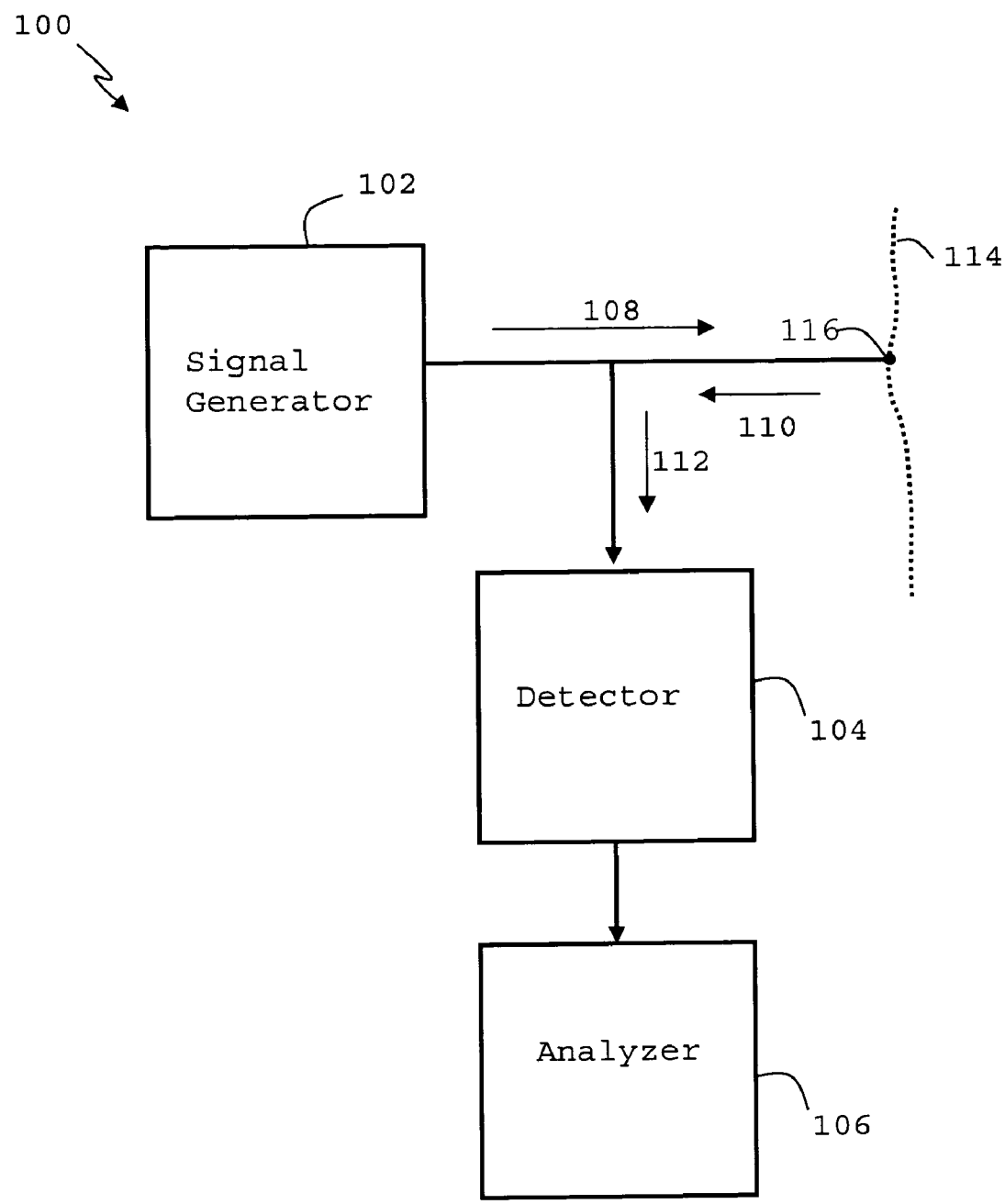
FIG. 1 is a block diagram of an apparatus for testing an electronic signal path in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

FIG. 1 illustrates a block diagram of an apparatus for testing the integrity of a signal path, in accordance with an embodiment of the present invention. The apparatus, referred to as a Mixed Signal Reflectometer (MSR), is shown generally at 100. The MSR 100 may include a signal generator 102 configured to inject a test signal 108 into the signal path 114 at an injection point 116 when coupled to the signal path. The MSR may further include a detector 104 coupled to the signal generator and configured to receive a combined signal 112 at the injection point when coupled to the signal path and configured to determine an autocorrelation of the combined signal. The combined signal includes the superposition of the test signal and reflections 110 of the test signal from the signal path, as discussed further below. The MSR may further include an analyzer 106 coupled to the detector and configured to determine a characteristic of the signal path from the autocorrelation.

Reflections of the test signal from the signal path may be generated when impedance discontinuities are present in the signal path, including, for example, an open circuit, short circuit, mismatched termination, junction, etc. Depending on the number and magnitude of the impedance discontinuities, the number and amplitude of reflections will vary. For example, for a signal path terminated in its characteristic impedance, no measurable reflection may be observed; for a signal path with many junctions, numerous reflections may be observed.

Because the test signal 108 and reflected signal 110 are not separated from each other in time, as in TDR techniques, or physically separated (e.g., using directional couplers) as in FDR techniques, the reflected signal 110 is superimposed upon the test signal 108, producing a combined signal 112. Depending on the characteristics of the signal path 114, the combined signal will demonstrate unique characteristics in phase and amplitude as a function of the frequency of the test signal as discussed further below. The detector converts these unique phase and amplitude characteristics into an autocorrelation. The autocorrelation can then be analyzed by the analyzer to extract characteristics of the signal path.

The MSR provides several advantages over FDR, TDR, and SWR techniques. For example, the autocorrelation is approximately constant for particular test signal frequency, hence the detector and analyzer need not operate with precise timing as is required for TDR. Because the combined signal is used by the detector, the need for expensive and bulky directional couplers as required for FDR is avoided. The autocorrelation produced by the detector provides sharper peaks and nulls than conventional SWR enabling more accurate location of impedance discontinuities in the signal path.

The principle of operation of the MSR 100 will now be described. In a first mode of operation, the signal generator 102 may generate a test signal 108 which is a sine wave with a frequency $\omega$. The test signal is thus given by:

$$\sin(\omega t). \qquad (1)$$

Assuming, for illustration purposes, the signal path 114 has an impedance discontinuity that results in a reflected signal 110 of the form:

$$\beta \sin(\omega t + \theta) \qquad (2)$$

where $\theta = \omega \tau$ and $\tau$ indicates the round trip propagation time to the impedance discontinuity. The injected test signal and reflected superimposed signals thus superimpose to form the combined signal:

$$\sin(\omega t) + \beta \sin(\omega t + \theta) \qquad (3)$$

which is the input to the detector 104.

The detector 104 determines the autocorrelation of the combined signal. The detector may be implemented in a variety of ways, including for example, and not by way of limitation, a square law device and low frequency extractor. Considering the example of a square law device and DC extractor, the detector first forms the square of the combined signal 112:

$$[\sin(\omega t) + \beta \sin(\omega t + \theta)]^2 \qquad (4)$$

$$= \sin^2(\omega t) + 2\beta \sin(\omega t)\sin(\omega t + \theta) + \beta^2 + \sin^2(\omega t + \theta). \qquad (5)$$

By using the trig identity $$\sin^2(x) = \frac{1}{2} - \frac{1}{2}\cos(2x) \quad (6)$$

the square can be rewritten as:

$$\frac{1}{2} - \frac{1}{2}\cos(2\omega t) + 2\beta\sin(\omega t)\sin(\omega t + \theta) + \frac{\beta^2}{2} - \frac{\beta^2}{2}\cos(2\omega t + 2\theta). \quad (7)$$

By using the trig identity, $$\sin(a)\sin(b) = \frac{1}{2}[\cos(a-b) + \cos(a+b)], \quad (8)$$

the square can be further rewritten as:

$$\frac{1}{2} - \frac{1}{2}\cos(2\omega t) + \beta[\cos(-\theta) - \cos(2\omega t + \theta)] + \frac{\beta^2}{2} - \frac{\beta^2}{2}\cos(2\omega t + 2\theta). \quad (9)$$

Rearranging terms, and using the fact that cosine is an even function, yields:

$$\frac{1}{2} + \frac{\beta^2}{2} + \beta\cos(\theta) - \frac{1}{2}\cos(2\omega t) - \beta\cos(2\omega t + \theta) - \frac{\beta^2}{2}\cos(2\omega t + 2\theta). \quad (10)$$

The low frequency extraction function will then eliminate all of the high frequency terms having cos(2ωt), to yield the autocorrelation:

$$\frac{1}{2} + \frac{\beta^2}{2} + \beta\cos(\theta). \quad (11)$$

Figure 2:
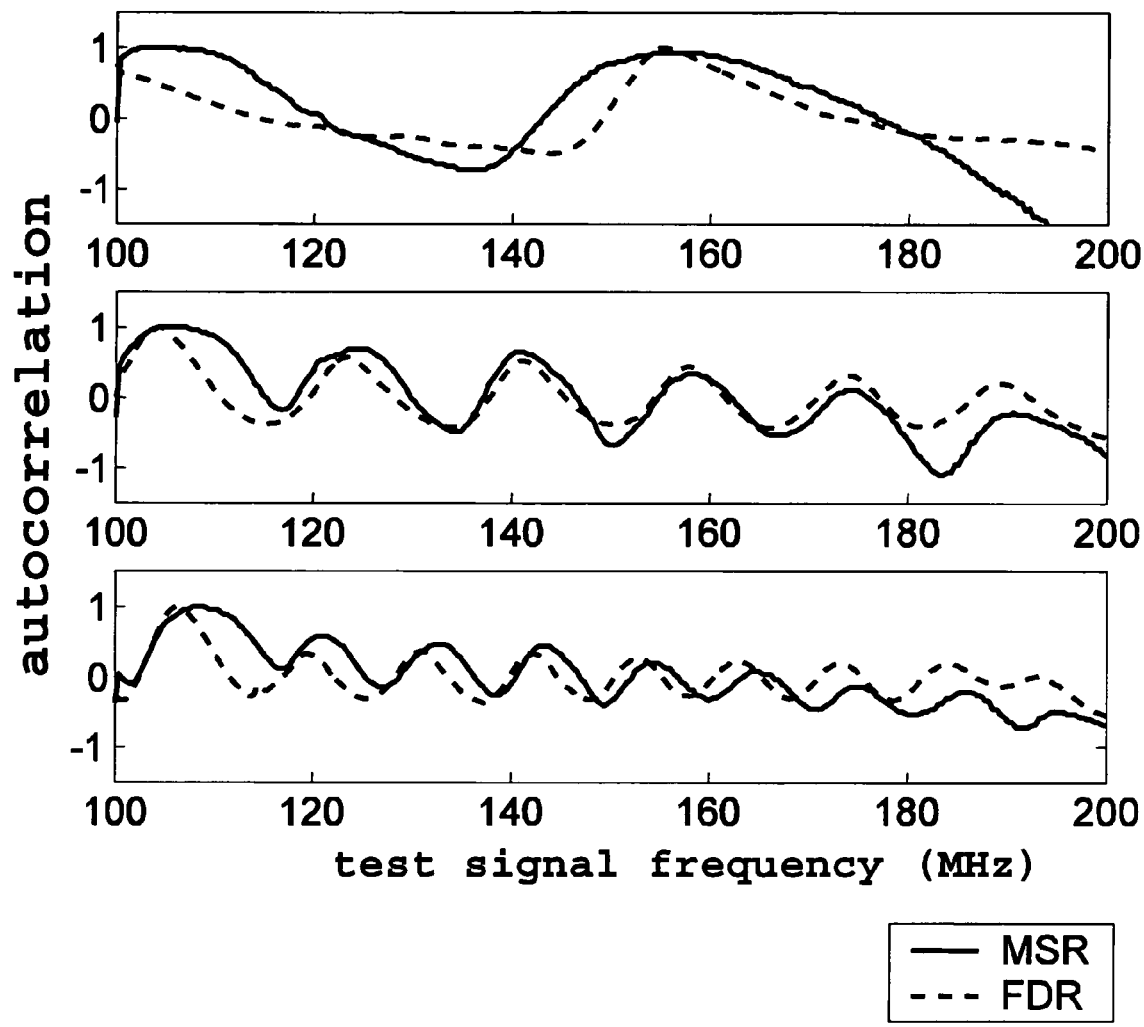
FIG. 2 illustrates an example of the autocorrelation for three signal path examples compared to a result obtained using a frequency domain reflectometry technique.

FIG. 2 illustrates an example of the autocorrelation for three signal path examples (labeled MSR) compared to a result obtained using a frequency domain reflectometry technique (labeled FDR). The top trace shows an example where the signal path is a wire of length 91.4 cm, the center trace a wire of length 457.2 cm, and the bottom trace a wire of 711.2 cm. The results have been normalized to a maximum of 1 for illustration purposes. The results in FIG. 2 were obtained using the MSR circuit of FIG. 3 discussed further below. The variation in the autocorrelation as a function of frequency is approximately as predicted by equation (11). Note the presence of a small trend towards smaller autocorrelation values as the frequency increases; this trend is due, in part, to attenuation in the wire which increases at higher frequency.

Many alternatives for implementing the signal generator 102 are possible as will occur to one skilled in the art. The signal generator may be implemented using a VCO, for example, as described above. The signal generator may also be implemented using a frequency synthesizer. Furthermore, the signal generator may be implemented using several VCOs, where each VCO tunes a different range of frequencies. The resulting test signal may thus take on a variety of forms, including a swept-frequency sine wave, a multi-component wave (i.e., a sum of multiple sine waves of different frequencies), and a stepped-frequency sine wave.

The test signal may even take the form of an arbitrary signal as will now be explained. For a function f(t) which is square integrable, its autocorrelation function is defined as $$\phi_f(t) = \int_{-\infty}^{\infty} f(t)f(t-\tau)dt. \quad (12)$$

If g(t)=f(αt) (that is, it is time scaled), then $$g(t-\tau) = f(\alpha t - \alpha\tau) \quad (13)$$

and $$\phi_g(t) = \int_{-\infty}^{\infty} g(t)g(t-\tau)dt \quad (14)$$

$$= \int_{-\infty}^{\infty} f(\alpha t)f(\alpha t - \alpha\tau)dt \quad (15)$$

$$= \frac{1}{\alpha}\int_{-\infty}^{\infty} f(s)f(s - \alpha\tau)ds \quad (16)$$

$$= \frac{1}{\alpha}\phi_f(\alpha\tau). \quad (17)$$

Hence, the autocorrelation of the scaled signal is a function of both the scaling factor, α, and the delay τ. Note that the autocorrelation will be smaller for higher scaling factors due to the 1/α term.

Hence, in a second mode of operation, the signal generator 102 may generate an arbitrary function g(t). The combined signal is then given by $$g(t) + \beta g(t-\tau) \quad (18)$$

where τ is the round trip propagation delay from the injection point to the impedance discontinuity causing the reflection and back to the injection point.

By squaring the combined signal, the square is obtained, which is $$(g(t) + \beta g(t-\tau))^2 \quad (19)$$

$$= g^2(t) + 2\beta g(t)g(t-\tau) + \beta^2 g^2(t-\tau) \quad (20)$$

Low pass filtering may be performed by integration, to yield the autocorrelation $$\int_{-\infty}^{+\infty} [g^2(t) + 2\beta g(t)g(t-\tau) + \beta^2 g^2(t-\tau)]dt \quad (21)$$

which may be rewritten using equation (17) as $$\frac{1}{\alpha}\phi_f(0) + \frac{2\beta}{\alpha}\phi_f(\alpha\tau) + \frac{\beta^2}{\alpha}\phi_f(0) \quad (22)$$

$$= \frac{1+\beta^2}{\alpha}\phi_f(0) + \frac{2\beta}{\alpha}\phi_f(\alpha\tau) \quad (23)$$

For the case where f(t) is a sine (or cosine) wave, α corresponds to the frequency ω, and equation (23) reduces to the sinewave case described in equation (11). For the more general case of an arbitrary signal, it can be seen that the time-scaling operation allows the autocorrelation to be found for a variety of time delay values (the argument of the autocorrelation function) using the detector 102. Hence, a variable time delay element as typically required in an autocorrelator is eliminated.

In light of the ability of use an arbitrary signal just described, the signal generator may be configured to generate a multi-frequency sine wave, a band limited-pulse, a spread-spectrum signal, or a noise-like signal. Depending on the nature of the signal path, different waveforms may prove beneficial. For example, for a highly band-limited signal path a band-limited pulse may be more compatible than the wide-bandwidth pulses required by TDR. Spread-spectrum or noise-like signals may permit testing while the signal path has an operational signal present. For example, for a description of how a spread-spectrum signal may be generated, see PCT Patent Application Serial No. PCT/US2004/03343, entitled "Method and Apparatus for Characterizing a Signal Path Carrying an Operational Signal," filed Feb. 4, 2004, which is herein incorporated by reference for all purposes. For a discussion of noise-like signals, see PCT Patent Application Serial No. PCT/US2004/008165 entitled "Method and System for Testing a Signal Path Having an Operational Signal," filed Mar. 18, 2004, which is herein incorporated by reference for all purposes.

Figure 12:
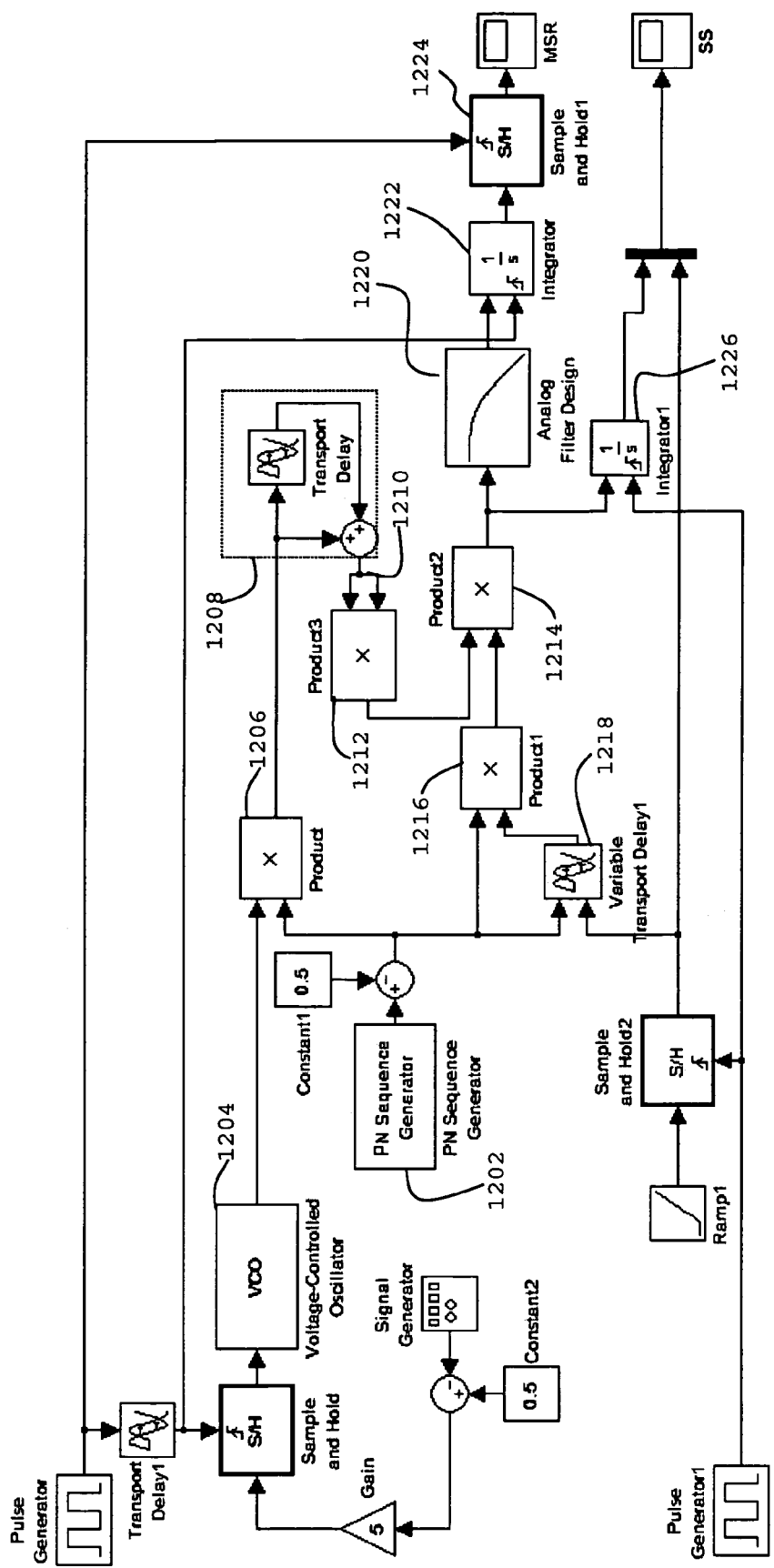
FIG. 12 is a block diagram of a simulation of a spread-spectrum mixed signal reflectometer in accordance with an embodiment of the present invention.

Another embodiment of the present invention, referred to as a Spread Spectrum Mixed Signal Reflectometer, combines the principles of the MSR 100 discussed above and a Spread Spectrum TDR as described by co-pending PCT Patent Application Serial No. PCT/US2004/03343. FIG. 12 illustrates a Matlab Simulink simulation of a SSMSR.

The PN code generator 1202 produces a PN sequence output D(t), and the VCO 1204 outputs a carrier signal sin(ωt). These are multiplied together by product 1206 to produce a spread-spectrum signal. The spread-spectrum signal is applied to the simulated channel 1208. The combined signal 1210 from the simulated channel will be given by:

$$D(t)\sin(\omega t) + D(t-\tau)\sin(\omega t + \theta(\tau)) \tag{24}$$

Since the phase of the combined signal is dependent on τ, so, it is denoted as θ(τ).

Notice that D(t) and D(t−τ) are uncorrelated. So, after integration and lowpass filtering, the terms containing the product D(t) and D(t−τ) will be filtered out. Also, $D^2(t)=1$ for all t. Hence, the square output of Product3 1212 is given by:

$$[D(t)\sin(\omega t) + D(t-\tau)\sin(\omega t + \theta(\tau))]^2 = \tag{25}$$
$$D(t)^2\sin^2(\omega t) + 2D(t)D(t-\tau)\sin(\omega t)\sin(\omega t + \theta(\tau))$$
$$+ D^2(t-\tau)\sin^2(\omega t + \theta(\tau)) = \tag{26}$$
$$\sin^2(\omega t) + 2D(t)D(t-\tau)\sin(\omega t)\sin(\omega t + \theta(\tau))$$
$$+ \sin^2(\omega t + \theta(\tau)) \tag{27}$$

This is then multiplied using Product2 1214 by 2D(t)D(t−τ) produced by Product1 1216 to give $$2\sin(\omega t)\sin(\omega t + \theta(\tau)) \tag{28}$$
$$= \cos(\theta(\tau)) - \cos(2\omega t + \theta(\tau)) \tag{29}$$

When the Variable Transport Delay1 1218 equals τ' and is not equal to τ, then we have after "Product2":

$$D(t)D(t-\tau')\sin^2(\omega t) + 2D(t)^2 D(t-\tau)D(t-\tau')\sin(\omega t)\sin(\omega t + \theta(\tau)) + \tag{30}$$
$$D(t)D(t-\tau')\sin^2(\omega t + \theta(\tau))$$

which will result in a very small value after "Integrator1" 1226, and small values being passed through the Low Pass Filter 1220, Integrator 1222, and Sample and Hold1 1224.

On the other hand, when Variable Transport Delay1 1218 equals τ, then the output of Product 1 will be:

$$\cos(\theta(\tau)) - \cos(2\omega t + \theta(\tau)) \tag{31}$$

which will result in a larger value which indicates a match between the Variable Transport Delay1 and the delay in the signal path. The output from the Sample and Hold1 1224 will have a value proportional to cos(θ(τ)). When the VCO frequency is increased, the output of the Sample and Hold1 will trace out a sinusoidal function of a frequency related to the delay value of the signal path.

The detector includes Product3 1212 and Low Pass Filter 1220. The spread-spectrum correlator includes Product2 1214 and Integrator1 1226. The spread-spectrum correlator correlates the square (produced by Product3) with a time delayed version of the spread-spectrum test signal produced by Product1 1216. Hence, in accordance with another embodiment of the present invention, an MSR 100 may further include a correlator configured to correlate the square with a delayed version of the test signal and output a correlated signal to the low-frequency extractor wherein the signal generator is configured to produce a spread-spectrum signal.

Figure 13:
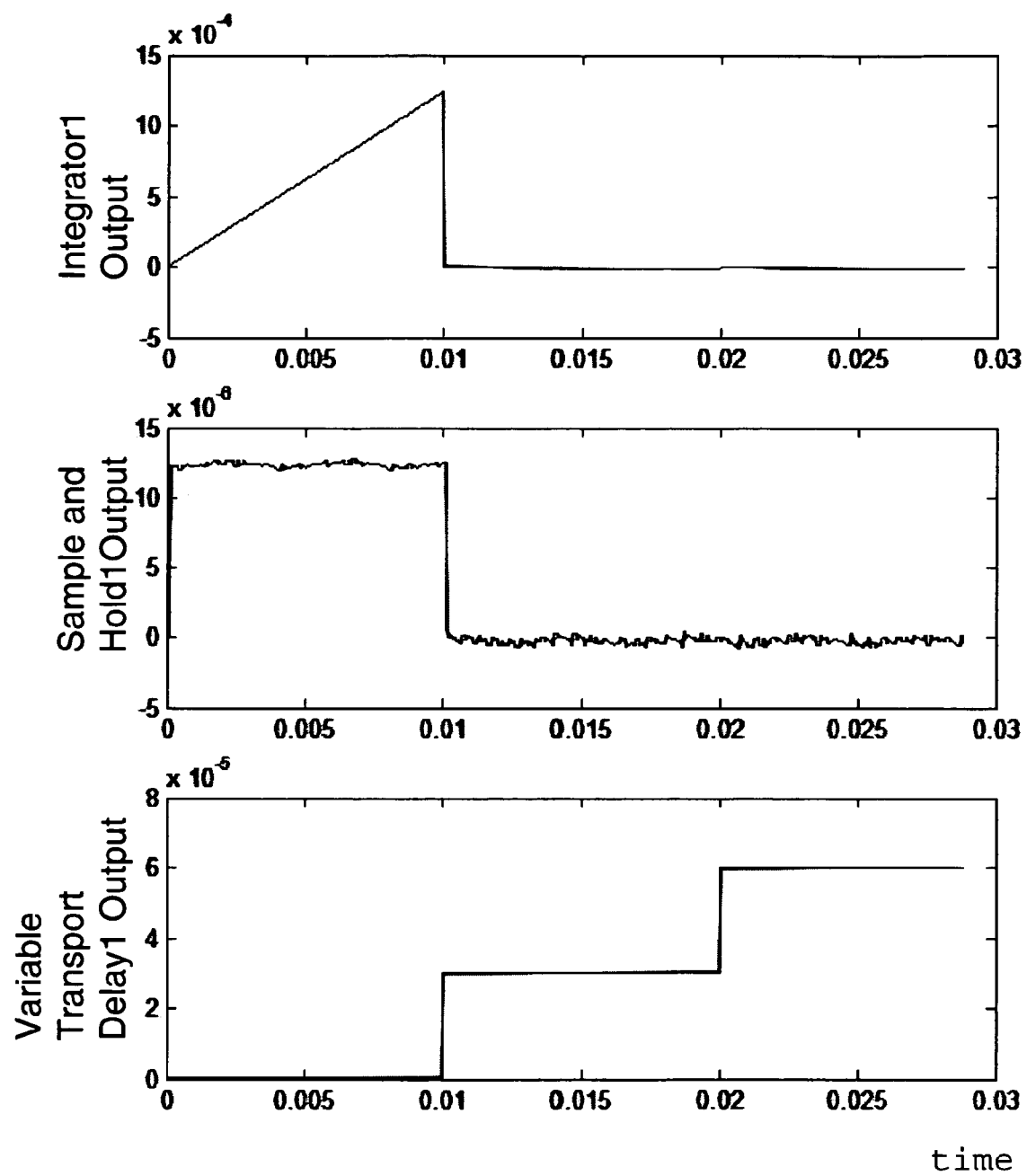
FIG. 13 is a timing diagram showing the operation of the spread-spectrum mixed signal reflectometer of FIG. 12 over a first time interval.
Figure 14:
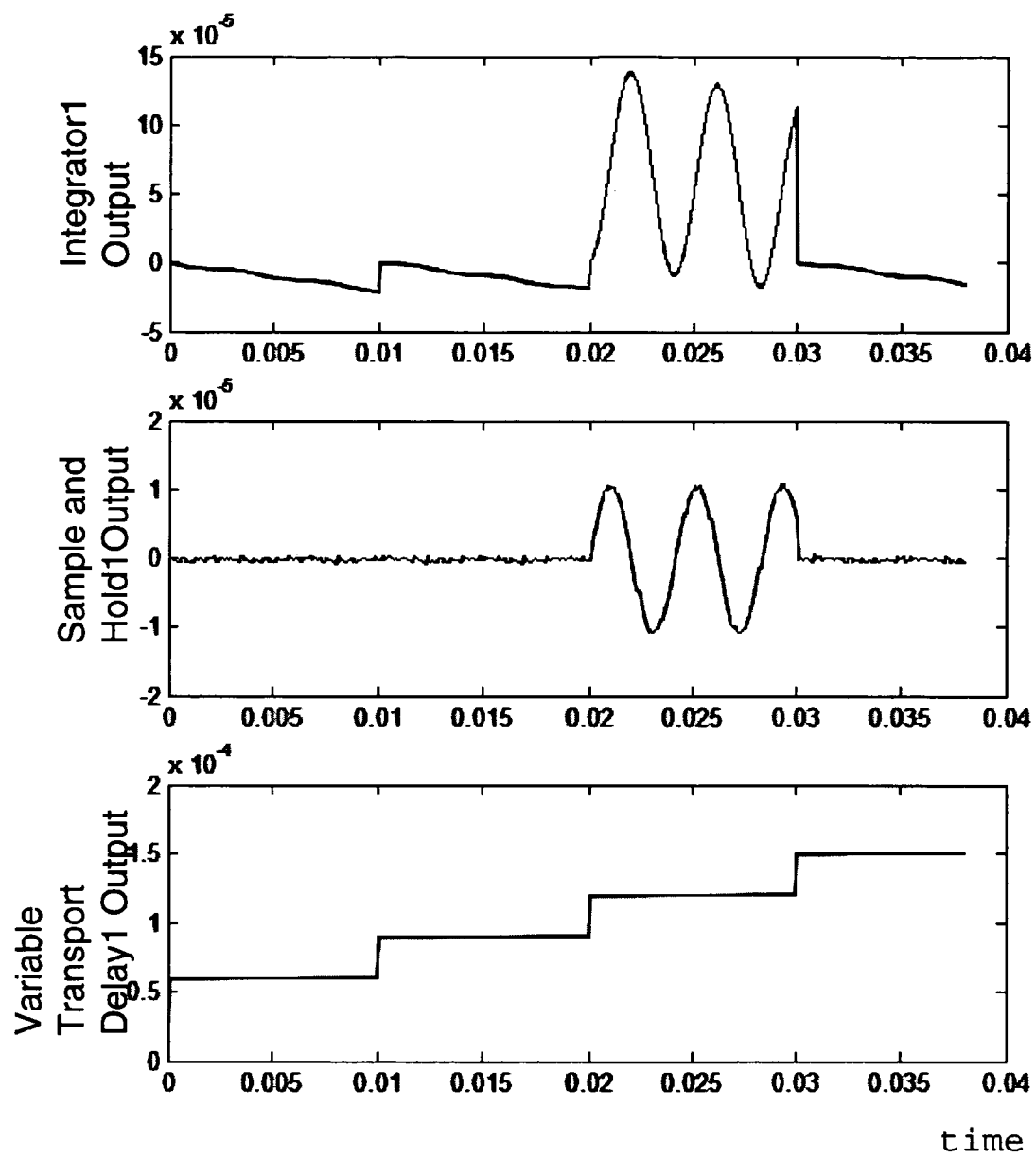
FIG. 14 is a timing diagram showing the operation of the spread-spectrum mixed signal reflectometer of FIG. 12 over a second time interval.

FIG. 13 and FIG. 14 illustrate a trace of the outputs from the Sample and Hold1, Integrator1, and Variable Transport Delay1 1216. FIG. 13 show the operation for τ=0 to τ=6× $10^{-5}$ seconds, from which the large response for τ=0 can be seen. FIG. 14 shows the operation for τ=6×$10^{-5}$ to τ=15× $10^{-5}$ seconds, from which the large response for τ=15×$10^{-5}$, corresponding to the actual delay in the signal path, can be seen. Advantages of using a spread-spectrum signal are that it may be possible to perform testing on a signal path while an operational signal is present.

Figure 3:
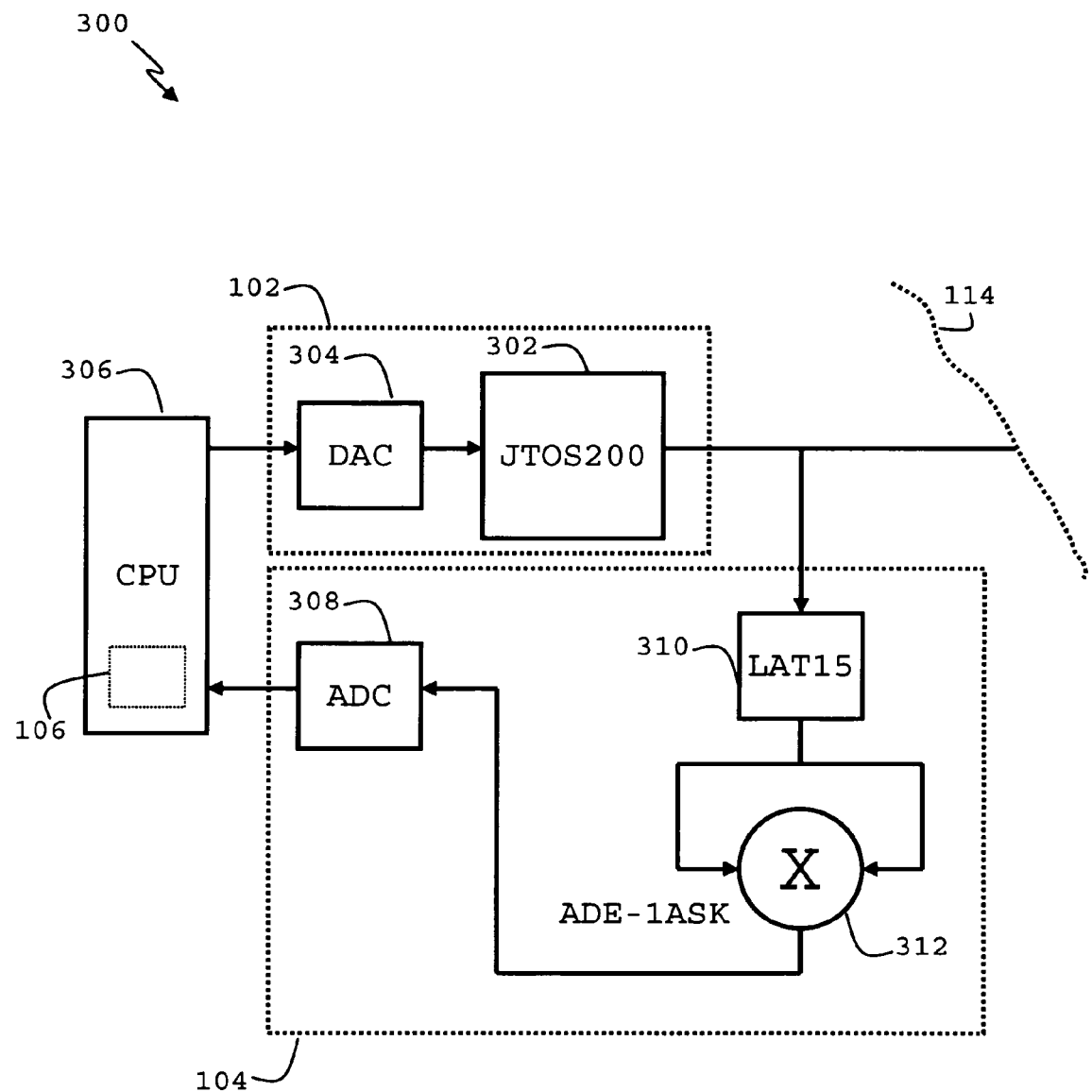
FIG. 3 is a circuit diagram of a mixed signal reflectometer in accordance with an embodiment of the present invention.
Figure 4:
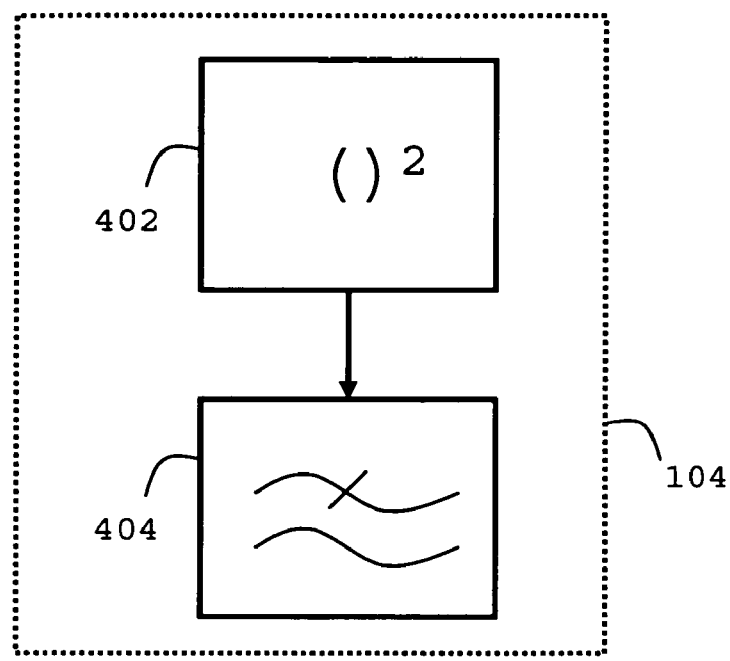
FIG. 4 is a block diagram of an implementation of a detector in accordance with an embodiment of the present invention.
Figure 5:
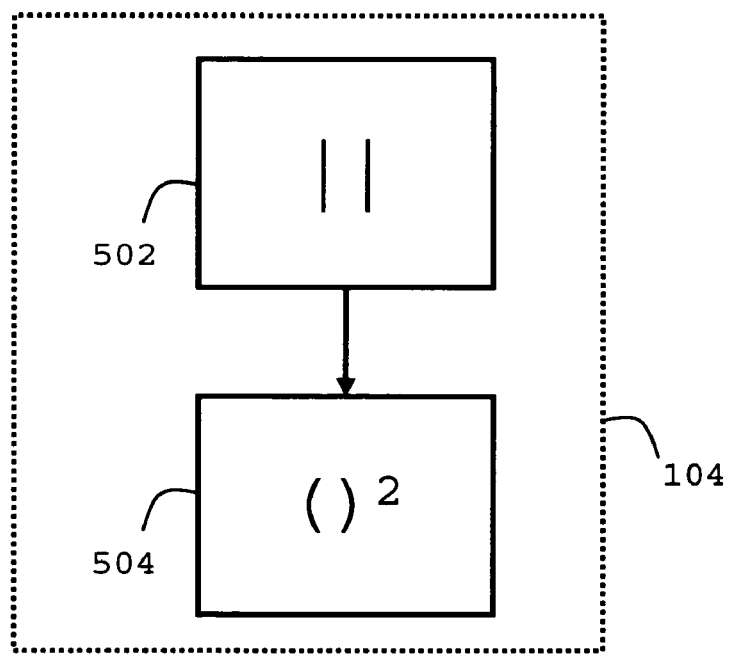
FIG. 5 is a block diagram of another implementation of a detector in accordance with an embodiment of the present invention.

Returning to the discussion of the MSR 100 illustrated in FIG. 1, various alternatives for implementing the detector 104 are possible. For example, the detector may be implemented using a square law device 402 and a low frequency extractor 404, for example as described above, and as illustrated in FIG. 4 in accordance with an embodiment of the present invention. Various square law devices are known in the art, including, and not by way of limitation, a mixer, exponential amplifier, multiplier, or a non-linear function. For example, the square law device may be implemented using a mixer 312, wherein mixing inputs of the mixer are configured to receive the combined signal and the output of the mixer produces the square of the combined signal, as illustrated in FIG. 3 in accordance with an embodiment of the present invention. In another example, the square law device may be implemented by using an envelope detector 502 followed by a squaring device 504 as illustrated in FIG. 5 in accordance with an embodiment of the present invention. Various other implementations of the detector will occur to one of skill in the art and in possession of this disclosure and are to be considered within the scope of the present invention.

The low frequency extractor 404 may be implemented using a low pass filter, an integrating amplifier, a summing amplifier, or a summation circuit. In general, any component with a limited frequency response may also provide this function. For example, an analog to digital converter (308 in FIG. 3) may automatically extract the low frequency components where there is a limited frequency response of the analog to digital converter.

The analyzer 106 will now be discussed in further detail. The analyzer may be configured to determine various characteristics of the signal path, including, wire length, cable impedance, and distance to an impedance discontinuity.

For example, the analyzer may determine the distance to an impedance discontinuity (e.g., one caused by a fault) by examining the variation of the detector output as a function of the test signal frequency $\omega$. For example, the detector output will vary from a maximum, where $$\theta_1 = \omega_1 \tau = 2k\pi \quad (32)$$

to a minimum, where $$\theta_2 = \omega_2 \tau = 2(k+1)\pi \quad (33)$$

where k is a positive integer. As $\omega$ is varied over a range, the detector output will periodically vary between a minimum and maximum. Hence, the distance to the fault, $\tau$, may be determined by varying $\omega$ and finding the distance between these extrema (minimums or maximums), where $$\tau = \pi/(\omega_2 - \omega_1). \quad (34)$$

Note that this distance is expressed in terms of a time delay. It frequently will be preferable to convert this distance into a length measurement by taking into account the propagation velocity in the signal path under test. The analyzer may automatically determine the propagation velocity from the magnitude and phase of the reflected signal that is returned from the beginning of the signal path under test (corresponding to a distance of $\tau=0$). Alternately, a fixed average propagation velocity may be assumed by the analyzer (resulting in reduced accuracy), or a user could provide input to the analyzer of the velocity propagation.

In the event that the distance to the fault, $\tau$, is very small, it may be possible that the extrema are very far apart, in which case it is impractical to search for the minimum and maximum. In this case, the analyzer 104 may be implemented by performing pattern matching against the expected detector output by injecting several different test values of $\omega$ and performing a best fit estimate to determine $\beta$ and $\tau$. In such a case, the signal generator may be configured to generate a number of discrete frequency sine waves as discussed above. Pattern matching may be performing by comparing the autocorrelation to an expected autocorrelation for a hypothesized signal path characteristic.

Pattern matching the autocorrelation may be performed based on the Cauchy-Schwartz Inequality, which provides that for two vectors, $\bar{x}$ and $\bar{y}$, $$|\langle \bar{x}, \bar{y} \rangle| \leq \|\bar{x}\|\|\bar{y}\| \quad (35)$$

Especially for vector space Rn with Euclidean inner products, we have $$(\bar{x}^T, \bar{y})^2 \leq (\bar{x}^T, \bar{x})(\bar{y}^T, \bar{y}) \quad (36)$$

where the equality only holds when $\bar{x} = \alpha \bar{y}$ for some $\alpha$. That is, when the norm of both $\bar{x}$ and $\bar{y}$ are fixed respectively, the right hand side of equation (36) will reach its maximum if $\bar{x} = \alpha \bar{y}$. This property may be used to search for the closest match of a given function $\bar{x}$ among a given set of functions $Y = \{\bar{y}\}$ with $\|\bar{y}\| = c \forall \bar{y} \in Y$ where c is a constant. The basic approach is to find $\bar{y} \in Y$ that maximumizes $(\bar{x}^T \bar{y})^2$, i.e., $$\bar{y} = \arg\left(\max_y (\bar{x}^T \bar{y})^2\right) \forall \bar{y} \in Y \quad (37)$$

The above algorithm may be used by the analyzer to estimate the frequency, phase, amplitude, and DC offset of an unknown sinusoidal function, such as the autocorrelation.

For example, let the autocorrelation be given by $$x = A\sin(\omega t + \theta) + d \quad (38)$$

with A, $\omega$, $\theta$, and d to be determined. Equation (38) may be presented in vector form, $$\bar{x} = A\sin(\omega \bar{t} + \theta) + \bar{d} \quad (39)$$

$$= [\sin(\omega \bar{t})\cos(\omega \bar{t})\bar{1}] \begin{bmatrix} A\cos(\theta) \\ A\sin(\theta) \\ d \end{bmatrix} \quad (40)$$

$$= H(\omega)\bar{s}(A, \theta, d). \quad (41)$$

If we have the right match of A, $\omega$, $\theta$ and d, according to the Cauchy-Schwartz inequality, the quantity $$\frac{(\bar{x}^T H \bar{s})^2}{\|H\bar{s}\|^2} \quad (42)$$

should be maximized. Especially, if we exclude the case that $\bar{x}$ and $H\bar{s}$ are opposite in direction, we should have $$\frac{(\bar{x}^T H \bar{s})}{\|H\bar{s}\|} \quad (43)$$

being maximized.

The estimation of A, $\omega$, $\theta$ and d may be accomplished in two steps. First, for each given $\omega$, the optimal $\bar{s}$ is estimated. Second, with the optimal $\bar{s}$ for each $\omega$, the finite set of $\omega$ is searched to find the value of $\omega$ that maximizes $\bar{x}^T H \bar{s}$.

When $\omega$ is given, H becomes a constant. The optimal $\bar{s}$ is the one that maximizes $\bar{x}^T H \bar{s}/\|H\bar{s}\|$. From the principle of the Cauchy-Schwartz Inequality, we want to find $\bar{s}$ such that $\bar{x} \approx \alpha H \bar{s}$. As $\bar{x}$ are observed values which may contain noise, the best match in $l_2$ sense is $$\bar{s} = (H^T H)^{-1} H^T \bar{x} \quad (44)$$

See, e.g., T. K. MOON AND W. C. STIRLING, MATHEMATICAL METHODS AND ALGORITHMS FOR SIGNAL PROCESSING (2000). After the optimal $\bar{s}$ is determined, the optimal A, θ and d, may be determined for the given ω.

To determine the optimal ω, the set of possible ω may be searched to find that which maximizes $\bar{x}^T H \bar{s}/\|H\bar{s}\|$ with the already determined optimal $\bar{s}$.

The following pseudo code performs the pattern matching algorithm just described:

BEGIN $\bar{x}$: vector containing the autocorrelation with frequency, phase, amplitude, and DC offset to be determined Ω: search set of frequencies $\bar{t}$: vector containing points in time $\bar{s}$: vector containing amplitude, phase, and DC offset information Γ: vector containing the fitness value for each frequency for ω∈Ω

$$H = [\sin(\omega \bar{t}) \cos(\omega \bar{t}) \bar{1}]$$

$$\bar{s} = (H^T H)^{-1} H^T \bar{x}$$

$$\gamma = \frac{\bar{x}^T H \bar{s}}{\sqrt{\bar{s}^T H^T H \bar{s}}}$$

$$\Gamma = \lfloor \Gamma; \gamma \omega \bar{s} \rfloor$$

$$[\omega \bar{s}]_{optimal} = \max_{\gamma}(\Gamma)$$

$$\theta_{optimal} = \arctan\left(\frac{\bar{s}(2)}{\bar{s}(1)}\right)$$

$$amplitude_{optimal} = \bar{s}(3)$$

END

Because the pattern matching approach just described does not require the autocorrelation to be detected over a continuous band of frequencies, considerable flexibility in the signal generator is achieved. For example, the signal generator may be configured to generate signals in several different discrete frequency ranges. This may also prove beneficial for certain types of failures in a signal path, for example a fray or chafe which does not result in a complete open or short circuit. The characteristics of the fray or chafe may vary with the frequency of the test signal, making detection difficult or impossible for certain frequency ranges. By testing at several different frequencies, enhanced ability to detect a failure may be obtained.

Where multiple discontinuities exist in the signal path, multiple reflected signals may be superimposed on the test signal. This will result in a more complex combined signal. The more complex combined signal will result in a correspondingly more complex autocorrelation having extrema appearing at multiple different periodicities corresponding to the different distances to the multiple discontinuities. The spectrum of the autocorrelation will thus have multiple peaks at different frequencies corresponding to the different distances to the discontinuities.

The analyzer may be configured to estimate a spectrum of the autocorrelator, for example using a Fast Fourier Transform (FFT), to determine these multiple periodicies. Various other spectral analysis techniques are known the art which may be applied. Alternately, the techniques used to separate the line spectrum of chemical elements may be used to determine the delays (and hence distances) corresponding to the multiple discontinuities. For example, see pending PCT Patent Application Serial No. PCT/US2004/008165 for an exemplary method of analyzing the autocorrelation.

The signal path may include a network of connections: multiple junctions and branches. In general, each junction may result in a reflection (if there is an impedance discontinuity), and each branch may create its own reflections corresponding to its impedance discontinuities. These reflections propagate back to the injection point, resulting in a complex combined signal.

If the topology of the network is known, the observed autocorrelation can be compared to a baseline autocorrelation (either the expected autocorrelation or a predetermined autocorrelation) and changes in the signal path or the location of failures in the signal path be determined. Location of a failure may not, however, always be unambiguously determined.

Figure 6:
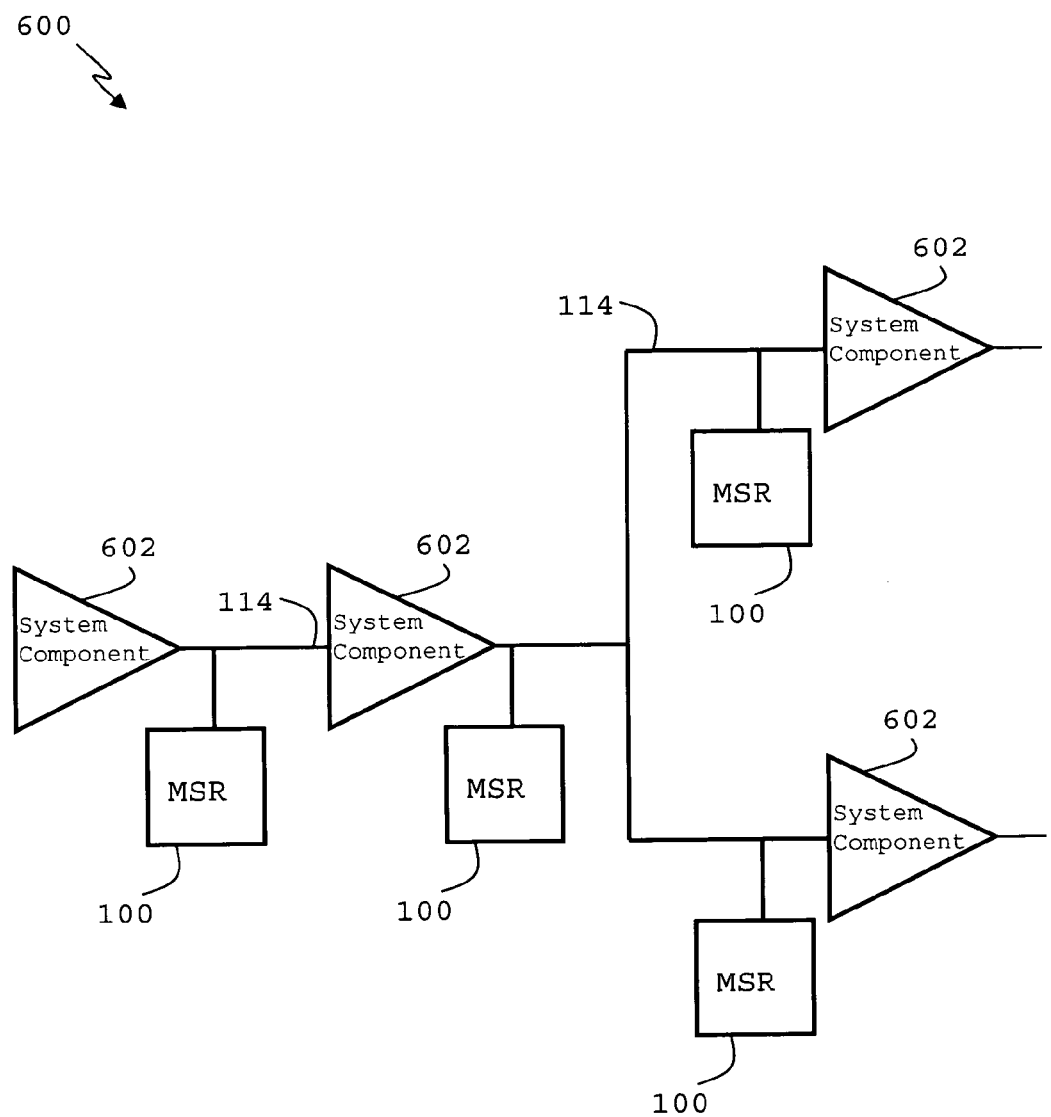
FIG. 6 is a block diagram of a system having integrated signal path testing in accordance with an embodiment of the present invention.

Hence, in accordance with another embodiment of the present invention, a system, shown generally at 600, having integrated signal path testing may be implemented as illustrated in FIG. 6. The system may include a plurality of signal paths 114 and system components 602, wherein a plurality of the signal paths include at least one MSR 100. The MSR may include a signal generator, a detector, and an analyzer, as described above. The autocorrelation results for the MSRs may be combined to allow the reduction of ambiguity. For example, the autocorrelation results may be communicated between the MSRs over the signal paths.

If the topology of the network is not known, mapping the network may be attempted. Unambiguous determination of the network topology may, however, not always be possible. For example, a mapping technique disclosed by A. Tarantola in "The Seismic Inverse Problem," *Inverse Problems of Acoustic and Elastic Waves*, ed. F. Santosa, et al., SIAM 1984, may be applied. The spectrum of the autocorrelation will have a number of peaks which correspond to the various time delays at which reflections are observed. This technique maps out the network by creating an ambiguity tree from early to late time delays. Each early time observation is "documented" (indicating either a junction or a mismatched cable at that point) and then "recalled" to predict a later network response (e.g., later reflections that would have been caused by the end of a wire if a junction had occurred at the previous point). This allows a junction to be distinguished from a discontinuity. For similar algorithms, see also T. Wang, *Transient Electromagnetic Modeling and Inversion*, Ph.D. Dissertation, The University of Utah, Salt Lake City, Utah (1984); Y. Zhang and C. Liu, *A Space Marching Inversion Algorithm for Pulsed Borehole Radar in the Time-Domain*, IEEE TRANS. GEOSCIENCE & REMOTE SENSING, Vol. 33, No. 3, pp. 541–550.

A detailed circuit diagram of a particular embodiment of an MSR will now be described. FIG. 3 illustrates a circuit diagram of an MSR in accordance with an embodiment of the present invention. The MSR, shown generally at 300, includes a signal generator 102, detector 104, and analyzer 106. The signal generator is implemented using a voltage controlled oscillator (VCO) 302 and digital to analog converter (DAC) 304. The VCO is implemented with a Minicircuits JTOS200. The frequency of the VCO is controlled by a computer 306 through the DAC 304 as will be discussed further below. The output of the signal generator is injected into the signal path 114. As discussed above, reflections from the signal path, for example, from the end of the wire, will superimpose on the injected signal to produce a combined signal. The combined signal is detected by the detector. The detector is implemented using Minicircuits ADE- LASK mixer 312. A Minicircuits LAT15 attenuator 310 is included to reduce the level of the combined signal to reduce the potential for overload of the mixer. The mixer is connected so that the combined signal is fed into both the local oscillator (LO) and radio frequency (RF) input ports. Hence, the mixer performs a squaring operation on the combined signal. The output from the mixer is fed to an analog to digital converter (ADC) 308. The ADC automatically filters out high frequency components, thus extracting the low-frequency (DC) components of the mixer output to produce the autocorrelation.

The computer 306 is programmed to control the overall operation of the MSR. The computer steps the VCO frequency from 100 to 200 MHz using 2048 steps of approximately 50 kHz each. At each frequency step, the computer holds the VCO frequency constant while the detector determines the autocorrelation. The computer then reads the autocorrelation from the DAC.

Figure 7:
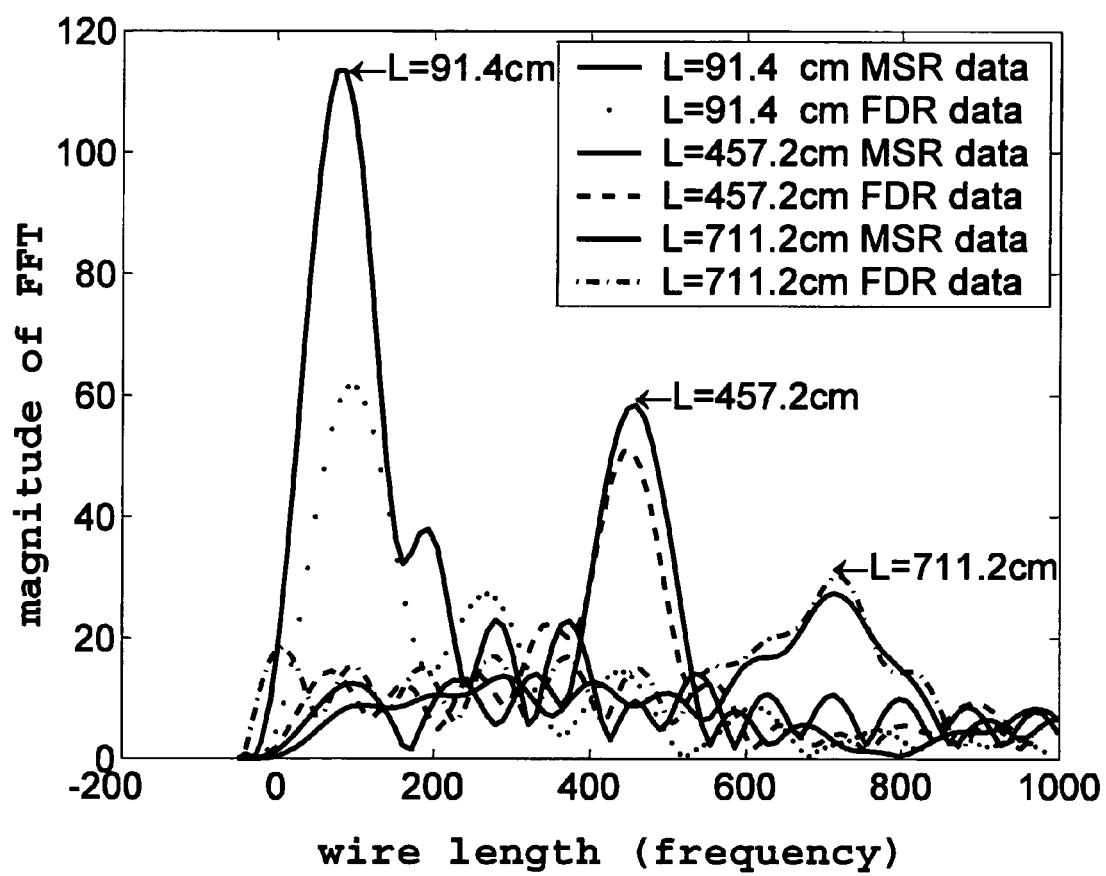
FIG. 7 is example estimated spectrum of the autocorrelation estimated with a Fast Fourier Transform in accordance with an embodiment of the present invention.

The computer 308 is also programmed to implement the analyzer 106. The computer records the 2048 autocorrelation values. As illustrated by equation (11), this set of readings will have a frequency that is linearly proportional to the wire length. The computer takes the set of 2048 readings and performs a Fast Fourier Transform (FFT) to determine the spectrum of the autocorrelation. The FFT result is illustrated in FIG. 7. As expected, the peak in the FFT corresponds to the predominant frequency observed in the autocorrelation, and corresponds to the wire length. The decreased magnitude of the FFT peak for increasing wire lengths is due to the attenuation of the wire as discussed previously.

Figure 8:
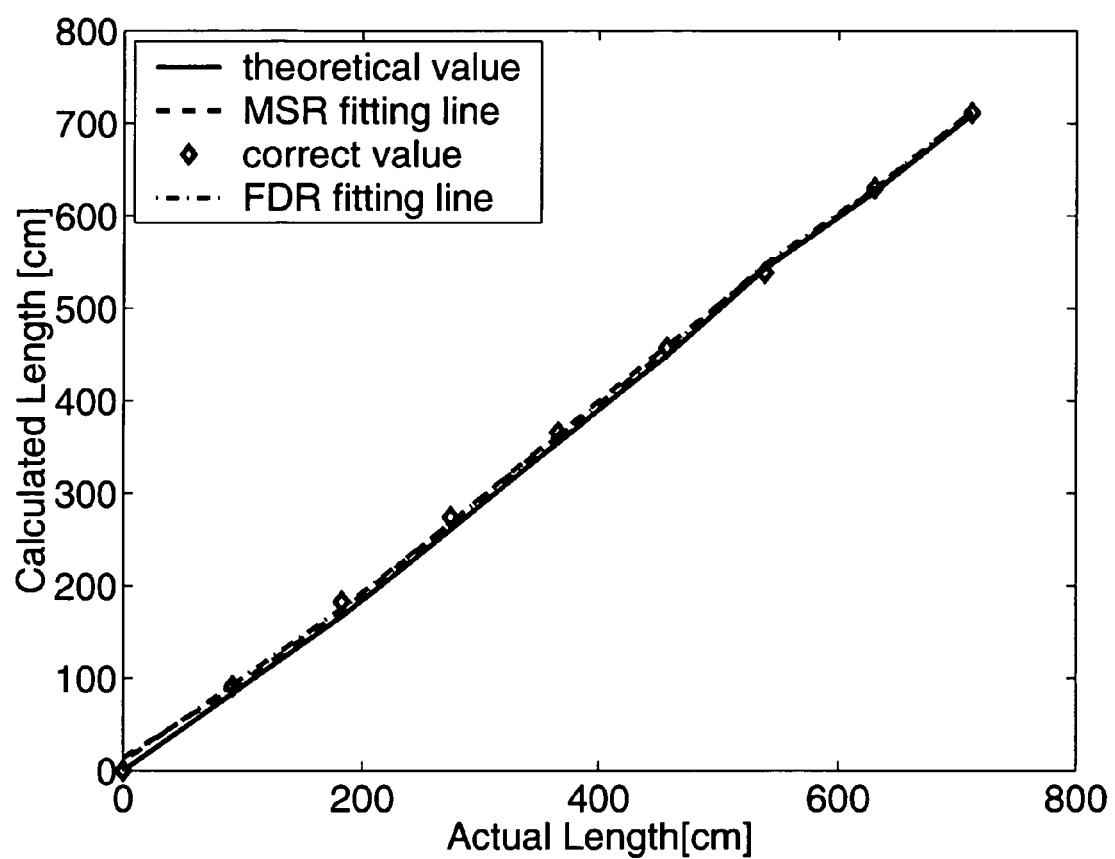
FIG. 8 is an example estimated wire length characteristic of a signal path estimated in accordance with an embodiment of the present invention.

The length of the wire is estimated by the computer by finding the FFT bin frequency corresponding to the peak of the spectrum. FIG. 8 illustrates the result for tests on a variety of wire lengths up to 800 cm. The results are accurate within 10 cm.

Although not present in the example shown here, reflections may be created right at the injection point due to an impedance mismatch between the MSR and signal path. This will result in a constant DC offset in the autocorrelation corresponding to zero length peak. This peak may be removed using various signal-processing techniques. For example, the DC offset may be estimated and removed before computing the FFT.

In another aspect of the present invention, a feedback loop may be used to control the signal generator, similar in the manner to which a phase lock loop operates. For example, based on the results from the analyzer, different signals may be generated by the signal generator. In this way, a cable could be scanned at multiple frequencies to account for the phase wraparound on cables longer than one wavelength. This would be similar to how SWR operates. If pulses are used rather than sinewaves, less computation power is required. Hence, the analyzer can control operation of the signal generator based on the autocorrelation.

An alternate form of the detector may be implemented as will now be discussed. The combined signal, given by equation (3) can be expressed in a different form as $$\sqrt{A^2+B^2}\sin(\omega t+\alpha) \tag{35}$$

where $$A=1+\beta\cos(\theta), \tag{36}$$

$$B=\beta\sin(\theta), \text{ and} \tag{37}$$

$$\alpha=\arctan(B/A). \tag{38}$$

If $\beta$ is small ($\beta \ll 1$), corresponding to high attenuation in the signal path, $$\alpha \approx \beta\sin(\theta). \tag{39}$$

In this case, the detector can be implemented using a phase detector, which will produce an approximately identical result at the previous cases.

Figure 9:
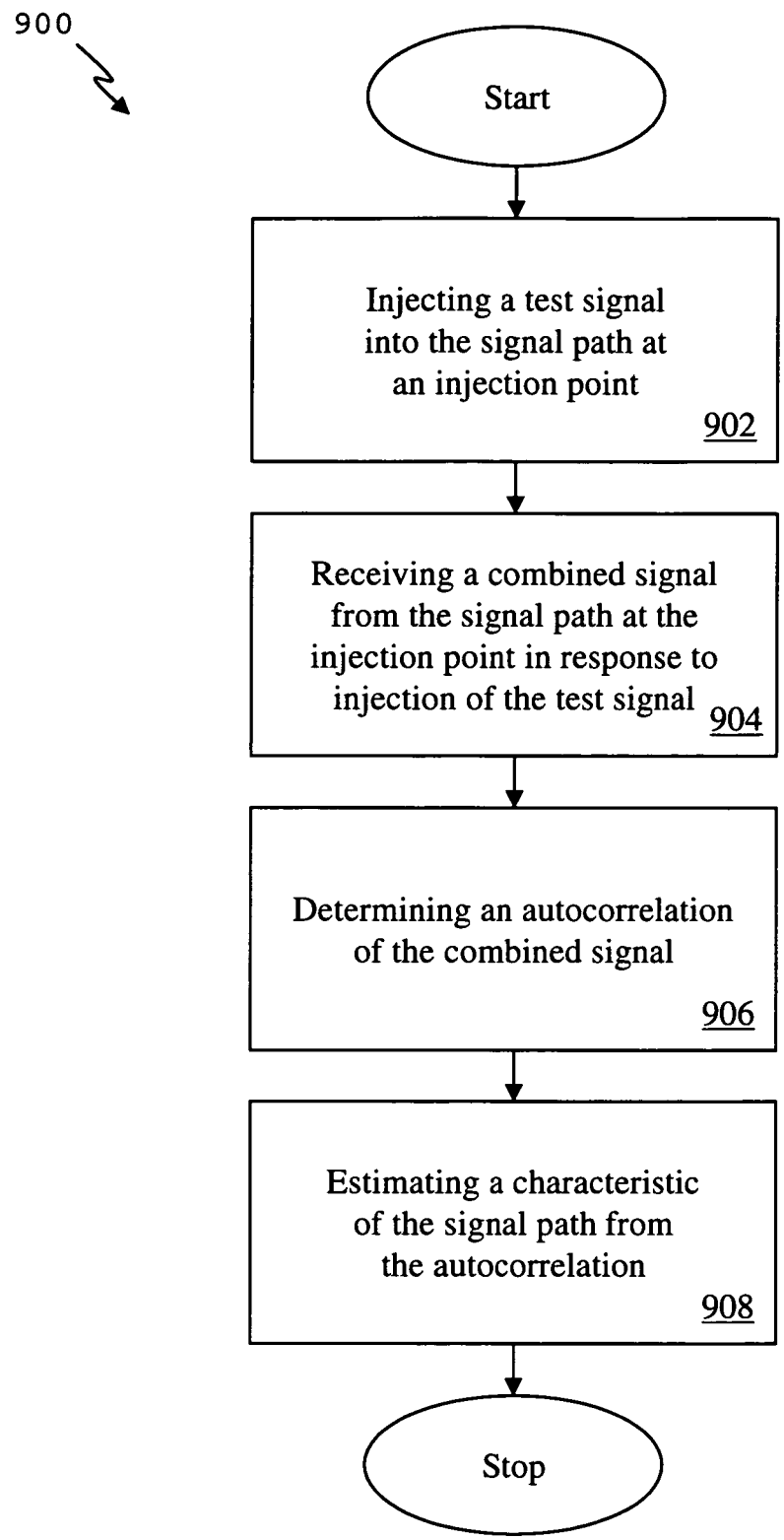
FIG. 9 is a flow chart of a method for detecting faults in a signal path in accordance with an embodiment of the present invention.

Finally, a method of testing a signal path is described. FIG. 9 illustrates a flow chart of a method for detecting faults in a signal path 900 in accordance with another embodiment of the present invention. The method may include injecting 902 a test signal into the signal path at an injection point. Although this test signal is usually chosen to be a swept-frequency sine wave, a variety of other test signals may also be used consistent with method as discussed previously. The method may further include receiving 904 a combined signal from the signal path at the injection point. The combined signal includes the superposition of the test signal and reflections of the test signal from the signal path as discussed previously.

The method may further include determining 906 an autocorrelation of the combined signal. Various techniques for determining the autocorrelation have been discussed above. Finally, the method may further include estimating 908 a characteristic of the signal path from the autocorrelation. Various techniques for estimating a characteristic of the signal path have been discussed above.

Although this description has focussed mainly on the testing a signal path, there are numerous other applications for embodiments of the present invention. The following exemplary embodiments are among the many potential applications of the inventions disclosed herein. Of course, other applications of the MSR technology will be readily apparent to one of ordinary skill in the art.

Figure 15:
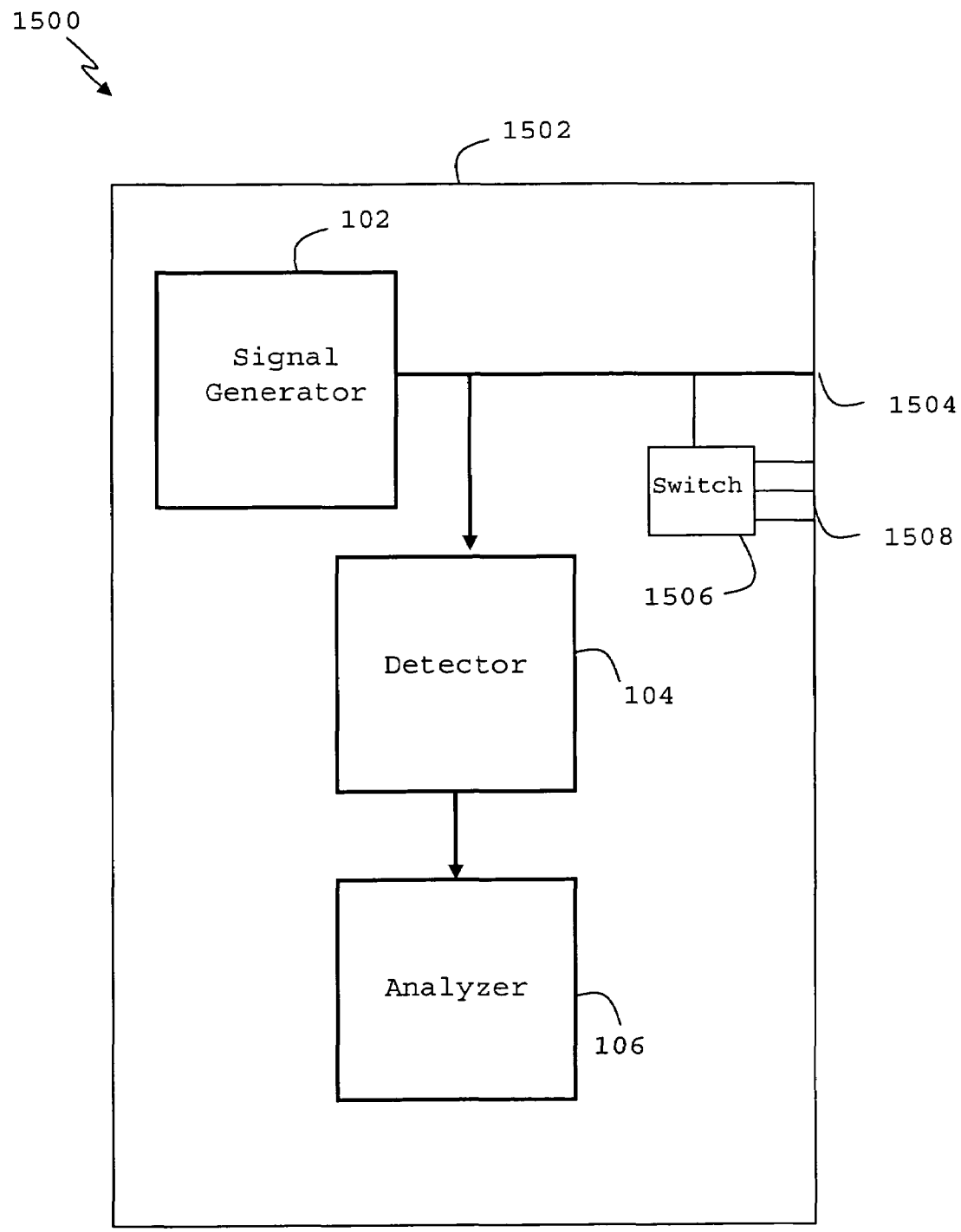
FIG. 15 is a block diagram of a mixed signal reflectometer within an enclosure in accordance with an embodiment of the present invention.

Handheld Tester. A handheld meter can contain the MSR and may be attached to the signal path wiring through any ordinary junction point, e.g., circuit breaker, connector, wiring integration unit and junction box. The user can test one wire alone or could test a set of wires. For example, FIG. 15 illustrates an MSR packaged within an enclosure 1502 which may be in the form of a handheld meter. The enclosure may include a port 1504 for connection to a signal path. The port 1504 may include a test lead for connection to the wiring. In order to test a set of wires, a multiplexer or switch 1506 may be used to switch to each wire individually, and the handheld tester connected to multiple wires simultaneously using multiple ports 1508.

Circuit Breaker. A circuit breaker is a commonly available junction point in a circuit. The MSR may be integrated into existing or new circuit breakers, or otherwise placed within the circuit breaker panel. Hence, the enclosure 1502 (FIG. 15) may take the form of a circuit breaker housing or circuit breaker panel. The MSR can be used in conjunction with the circuit breaker, or can replace it, particularly if the MSR is configured to detect intermitted short circuits. For example, even if the signal path is not fully open or short-circuited and an intermittent arc occurs, a peak in the spectrum will appear corresponding to the location of the arc. Several readings may be stored, and compared sequentially. The maximum differences between the average or median of the readings may be obtained. The arc will show up as a peak in the maximum difference data at the location proportional to the location of the arc. One potential advantage of placing the MSR in a circuit breaker area or panel is that power is normally available for powering the test unit.

Connector. A connector associated with the wiring may contain the MSR electronics. Existing connectors may be replaced by MSR-enabled connectors, or a separate "connector-saver" that has male pins on one side and female sockets on the other, with the electronics included within the connector-saver. Then the existing connectors may be plugged into either side of this connector-saver. For example, see co-pending U.S. patent application Ser. No. 10/190,314, entitled Frequency Domain Reflectometry System for Testing Wires and Cables Utilizing In-Situ Connectors, Passive Connectivity, Cable Fray Detection, and Live Wire Testing, filed Jul. 5, 2002, published Jul. 3, 2003, for an example of a connector saver, which is herein incorporated by reference for all purposes. There are a number of options in powering a connector with MSR. For example, the connector may connect to power within the bundle being tested. Alternatively, the connector may include a battery (possibly rechargeable). Yet another alternative in the context of aircraft wiring, the connector may scavenge power from the aircraft surroundings using vibration, thermal changes, or other well-known power scavenging methods.

In addition, the connector may include a communication interface to get the data back to a central location for examination by a maintenance technician, pilot, remote decision-making interface, or the like. For example, each connector may include a communication link that is either hard-wired or wireless, e.g., RF, IR, etc. Alternately, the connector may be suitable for visual examination, for example by including a set of light emitting diode indicator outputs, or a hard-wired or wireless connection between a handheld PDA. If there are more than two wires within the bundle, the connector may include a multiplexer or set of switches to test each of the wires separately. Alternatively, several systems may be built into a single chip, embedded into the connector and configured to test the set of several wires simultaneously.

Junction Box or Panel. The MSR may be integrated into a junction box or panel. Such boxes, often called wiring integration units, may provide a convenient location for integrating the MSR into an existing electronic system.

Integrated testing. The MSR may be integrated into a new electronic system by including the MSR electronics within components, circuit boards, or sub-assemblies of the system.

Wiring. It has been contemplated that as the electronics for the MSR are reduced in size by manufacturing improvements and miniaturization, that the MSR may be imbedded directly within a roll of wiring. Multiple or single MSR units may be included within a roll of wiring. This application is particularly appealing for new types of wires that are being examined that are extruded and could be connected onto small circuit boards rather than the traditional connectors or for wires that are built on rolls of high-impedance plastic. These are the same materials, in some cases, that flexible circuit boards can be built on and, thus, that the MSR can be attached to.

Wireless Ranging. Another embodiment for the disclosed MSR technology is ranging, i.e., finding the distance. For example, the MSR technology can be used for determining a distance between two wireless transmitters or for ranging in radar or other wireless applications. In such an application, the signal path is a wireless propagation path, and the operation is as described above. As the reflections in such an application are weak, improved dynamic range in the detector may be obtained by performing a long integration or summation.

Height and Properties of Materials. The MSR technology can be used to determine the height of materials, e.g., grains/granular materials, water/fluids, etc., by measuring the length and multiple reflections on a wire imbedded in the material. Furthermore, the MSR technology may also be used to determine the electrical properties of materials and, thus, physical parameters such as moisture, salinity, fat/water content, etc.

Figure 10:
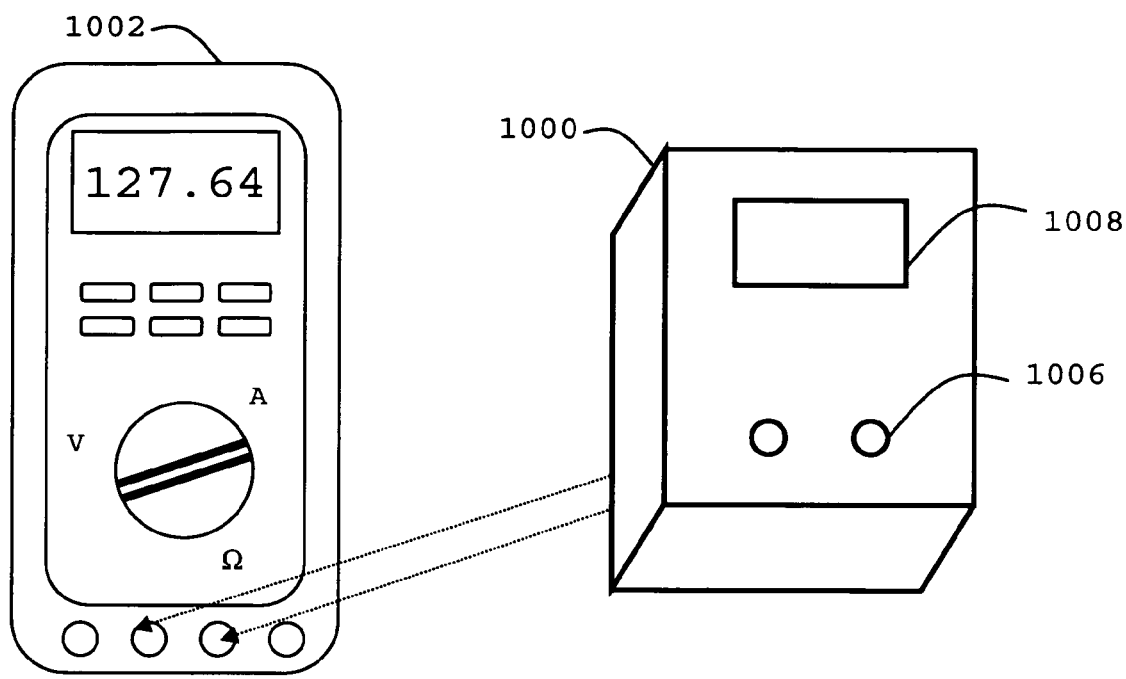
FIG. 10 is an illustration of an after-market add-on mixed signal reflectometer in accordance with an embodiment of the present invention.
Figure 11:
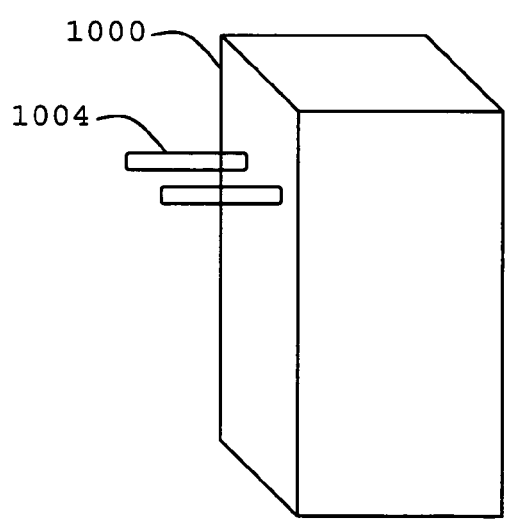
FIG. 11 is a side view of the after-market add-on mixed signal reflectometer of FIG. 10.

After-Market Add-On Solution. MSR technology may be implemented as an add-on circuit to be used in conjunction with an existing handheld multimeter to find faults or measure the length of a wire. This approach results in lower parts count and power requirements than a fully integrated MSR testing system, and provides a small, conveniently used and transported addition to a technician's test equipment. An integrated assembly combines the MSR technology, a battery or other power source, test leads, and a connection to an existing multimeter as illustrated in FIG. 10 and FIG. 11 in accordance with an embodiment of the present invention. The MSR add-on circuit 1000 can be snapped into the sockets of the existing multimeter 1002, or connected via leads to the sockets of the existing multimeter. For example, the MSR add-on may include plugs 1004 (shown in side view FIG. 11) configured to plug directly into the existing multimeter. The leads of the MSR add-on may be integral to the add-on, or the MSR add-on may include jacks 1006 for insertion of test leads. The leads of the MSR add-on circuit can be connected to the wire under test. The MSR add-on determines the distance to a fault or the length of the wire, and converts this to a voltage that is output to the multimeter. The user interprets this voltage measurement as a distance or length. For example, a voltage of 3.2 V may be output to indicate a distance of 3.2 meters, and positive or negative voltages may be used to indicate a short or open circuit. Alternately, the MSR add-on may include an integrated display 1008 which displays the result directly.

It is to be understood that the above-referenced arrangements are illustrative of the application for the principles of the present invention. Numerous modifications and alternative arrangements can be devised without departing from the spirit and scope of the present invention. While the present invention has been shown in the drawings and described above in connection with the exemplary embodiments of the invention, it will be apparent to those of ordinary skill in the art that numerous modifications may be made without departing from the principles and concepts of the invention as set forth in the claims.

What is claimed is:

1. An apparatus for testing an electronic signal path comprising:
   a) a signal generator configured to inject a test signal into the electronic signal path at an injection point when coupled to the electronic signal path whereby a combined signal is generated comprising a superposition of the test signal and reflections of the test signal generated within the electronic signal path;
   b) a detector coupled to the signal generator and configured to receive the combined signal at the injection point when coupled to the electronic signal path and configured to determine an autocorrelation of the combined signal; and
   c) an analyzer coupled to the detector and configured to determine a characteristic of the electronic signal path from the autocorrelation.

2. The apparatus of claim 1, wherein the signal generator is configured to produce a test signal chosen from the group of waveforms consisting of sine waves, swept-frequency sine waves, stepped-frequency sine waves, multi-component waves, band-limited pulses, spread-spectrum signals, and noise-like signals.

3. The apparatus of claim 1, wherein the detector comprises:
   a) a square law device configured to form a square of the combined signal; and
   b) a low-frequency extractor coupled to the square law device and configured to extract a low-frequency component from the square of the combined signal and output the low-frequency component as the autocorrelation.

4. The apparatus of claim 3 wherein the square law device is a mixer wherein mixing inputs of the mixer are configured to receive the combined signal whereby an output of the mixer produces the square of the combined signal.

5. The apparatus of claim 3 wherein the low-frequency extractor comprises a low pass filter.

6. The apparatus of claim 3 wherein the low-frequency extractor comprises a summation circuit.

7. The apparatus of claim 3 wherein the low-frequency extractor comprises an integrating amplifier.

8. The apparatus of claim 3 further comprising a correlator configured to correlate the square of the combined signal with a delayed version of the test signal and output a correlated signal to the low-frequency extractor wherein the signal generator is configured to produce a spread-spectrum signal.

9. The apparatus of claim 1, wherein the detector comprises a phase detector.

10. The apparatus of claim 1, wherein the detector comprises:
    a) an envelope detector configured to output an envelope of the combined signal; and
    b) a squaring device configured to square the envelope to produce the autocorrelation.

11. The apparatus of claim 1 wherein the analyzer is further configured to estimate a spectrum of the autocorrelation.

12. The apparatus of claim 11 wherein the analyzer is further configured to estimate at least one peak of the spectrum.

13. The apparatus of claim 12 wherein the analyzer is further configured to determine a distance to an impedance discontinuity in the electronic signal path based on the at least one peak.

14. The apparatus of claim 1 further comprising a multiplexer coupled to a plurality of co-located electronic signal paths and configured to selectably connect a single one of the plurality of co-located electronic signal paths to the signal generator and the detector.

15. The apparatus of claim 1 wherein the apparatus is configured as a handheld meter.

16. The apparatus of claim 1 wherein the apparatus is integrated into a circuit breaker.

17. The apparatus of claim 16 wherein the analyzer is configured to trip the circuit breaker when a fault in the electronic signal path is detected.

18. The apparatus of claim 1 wherein the apparatus is integrated into a connector associated with the electronic signal path.

19. The apparatus of claim 18 wherein the apparatus is supplied power by the electronic signal path.

20. The apparatus of claim 1 wherein the apparatus is integrated into a wiring integration unit.

21. The apparatus of claim 1 wherein the apparatus is integrated into an electronic system.

22. The apparatus of claim 1 wherein the apparatus is integrated into a wire.

23. The apparatus of claim 1 further comprising a housing having jacks configured for insertion into sockets of a multimeter wherein the signal generator, detector, and analyzer are packaged within the housing and the analyzer is configured to output a voltage to the jacks corresponding to the characteristic of the electronic signal path.

24. The apparatus of claim 1, wherein the analyzer is coupled to the signal generator and further configured to control the analyzer based on the autocorrelation.

25. An apparatus for testing an electronic signal path comprising:
    a) a signal generator configured to inject a non-sinusoidal test signal into the electronic signal path at an injection point when coupled to the signal path wherein a time-scale factor of the non-sinusoidal test signal is varied over a range of time-scale factors;
    b) a square-law device coupled to the signal generator and configured to receive a combined signal, the combined signal comprising a superposition of the test signal and at least one reflection of the test signal from a discontinuity in the electronic signal path, at the injection point when coupled to the electronic signal path and configured to determine a square of the combined signal; and
    c) a low-pass filter coupled to the detector and configured to extract a low-frequency component of the square to produce an autocorrelation result;
    d) an analyzer coupled to the detector and configured to determine a delay corresponding to the propagation distance to the at least one discontinuity based on a time-scale factor corresponding to a peak in the autocorrelation.

26. A method of testing an electronic signal path comprising:
    a) injecting a test signal into the electronic signal path at an injection point;
    b) receiving a combined signal from the electronic signal path at the injection point in response to the injection of the test signal wherein the combined signal comprises the superposition of the test signal and reflections of the test signal from the electronic signal path; and
    c) determining an autocorrelation of the combined signal;
    d) estimating a characteristic of the electronic signal path from the autocorrelation.

27. The method of claim 26 wherein determining an autocorrelation of the combined signal comprises:
    a) forming a square of the combined signal; and
    b) extracting a low-frequency component of the square.

28. The method of claim 26 wherein a frequency of the test signal is varied over a range of frequencies.

29. The method of claim 28 wherein the frequency of the test signal is varied over a non-contiguous range of frequencies.

30. The method of claim 26 wherein estimating the characteristic of the electronic signal path comprises:
    a) estimating a spectrum of the autocorrelation; and
    b) finding at least one peak of the spectrum of the autocorrelation whereby a frequency corresponding to the peak corresponds to a distance to a discontinuity within the electronic signal path.

31. The method of claim 30 wherein the spectrum is estimated using a Fast Fourier Transform.

32. The method of claim 26 wherein estimating the characteristic of the electronic signal path comprises estimating a distance to an impedance discontinuity within the electronic signal path based on a frequency difference between a minimum and a maximum of the spectrum.

33. The method of claim 26 wherein estimating a characteristic of the electronic signal path comprises comparing the autocorrelation to an expected autocorrelation for a hypothesized electronic signal path characteristic.

34. The method of claim 26 further comprising comparing the autocorrelation to a baseline autocorrelation to detect changes in the electronic signal path.

35. The method of claim 26 further comprising comparing the autocorrelation to a predetermined autocorrelation to detect faults in the electronic signal path.

36. The method of claim 26 wherein the characteristic of the electronic signal path is a distance in a wireless propagation path.

37. The method of claim 26 wherein the characteristic of the electronic signal path is a distance corresponding to a height of a material in proximity to the electronic signal path.

38. The method of claim 26 wherein the characteristic of the electronic signal path is an electrical property of a material in proximity to the electronic signal path.

39. The method of claim 26 wherein the electronic signal path comprises a material and the characteristic of the electronic signal path is an electrical property of the material.

40. A system having an integrated testing capability comprising:
   a) a plurality of system components interconnected by a plurality of electronic signal paths; and
   b) a plurality of mixed signal reflectometer units connected to the electronic signal paths wherein the mixed signal reflectometer unit comprises
      i) a signal generator configured to inject a test signal into the electronic signal path at an injection point;
      ii) a detector coupled to the injection point and configured to determine an autocorrelation of a combined signal comprising a superposition at the injection point of the test signal and reflections of the test signal from the electronic signal path; and
      iii) an analyzer coupled to the detector and configured to determine a characteristic of the electronic signal path from the autocorrelation.

* * * * *